(12) United States Patent
Ortmann et al.

(10) Patent No.: US 11,440,532 B2
(45) Date of Patent: Sep. 13, 2022

(54) METHOD AND SYSTEM FOR CONTROLLING VEHICLE ENGINE PULL-DOWN

(71) Applicant: FORD GLOBAL TECHNOLOGIES, LLC, Dearborn, MI (US)

(72) Inventors: Walter Joseph Ortmann, Saline, MI (US); Ashish Kumar Naidu, Canton, MI (US); Thomas William Megli, Dearborn, MI (US); Mrudula Uday Orpe, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/140,691

(22) Filed: Jan. 4, 2021

(65) Prior Publication Data

US 2022/0212653 A1 Jul. 7, 2022

(51) Int. Cl.
| | | |
|---|---|---|
| *B60W 20/00* | (2016.01) | |
| *B60W 20/15* | (2016.01) | |
| *B60W 10/06* | (2006.01) | |
| *F02D 41/06* | (2006.01) | |
| *B60W 40/09* | (2012.01) | |
| *B60W 50/00* | (2006.01) | |
| *G08G 1/00* | (2006.01) | |
| *G08G 1/01* | (2006.01) | |
| *F02D 41/04* | (2006.01) | |
| *B60W 10/08* | (2006.01) | |

(52) U.S. Cl.
CPC ............ *B60W 20/15* (2016.01); *B60W 10/06* (2013.01); *B60W 40/09* (2013.01); *B60W 50/0097* (2013.01); *F02D 41/042* (2013.01); *F02D 41/065* (2013.01); *G08G 1/0116* (2013.01); *G08G 1/22* (2013.01); *B60W 10/08* (2013.01); *B60W 2540/30* (2013.01); *B60W 2552/20* (2020.02); *B60W 2554/406* (2020.02); *B60W 2554/408* (2020.02); *B60W 2555/60* (2020.02)

(58) Field of Classification Search
CPC ............ B60W 10/06; B60W 2552/15; B60W 2552/30; B60W 2555/20; B60W 2555/60; F02D 28/00; F02D 2200/702
See application file for complete search history.

(56) References Cited

U.S. PATENT DOCUMENTS

| | | | |
|---|---|---|---|
| 8,606,483 B2 | 12/2013 | Krupadanam et al. | |
| 8,935,075 B2 | 1/2015 | Otanez et al. | |
| 9,415,773 B2 | 8/2016 | Johri et al. | |
| 9,597,979 B1 * | 3/2017 | Hao | B60K 6/387 |
| 9,792,736 B1 * | 10/2017 | Koebler | G07C 5/008 |
| 9,846,049 B2 * | 12/2017 | Krumm | G01C 21/3484 |
| 9,896,085 B2 * | 2/2018 | Morisaki | B60W 20/12 |
| 10,584,976 B2 * | 3/2020 | Kim | G08G 1/0112 |
| 10,829,104 B2 * | 11/2020 | Lavertu | B60W 50/0097 |
| 10,882,399 B2 * | 1/2021 | Koebler | B60L 50/62 |

(Continued)

*Primary Examiner* — Phutthiwat Wongwian
*Assistant Examiner* — Sherman D Manley
(74) *Attorney, Agent, or Firm* — David B Kelley; Brooks Kushman P.C.

(57) ABSTRACT

A vehicle includes an engine, a wireless transceiver that receives attribute data, and a controller. The controller selectively shuts down the engine responsive to such requests based on whether a predicted fuel savings associated with a predicted engine off duration is greater than a predicted fuel usage to restart the engine.

18 Claims, 5 Drawing Sheets

(56) References Cited

U.S. PATENT DOCUMENTS

| | | | |
|---|---|---|---|
| 11,084,377 B2* | 8/2021 | Koebler | B60L 50/62 |
| 11,117,566 B2* | 9/2021 | Pursifull | B60W 30/182 |
| 2005/0228553 A1* | 10/2005 | Tryon | B60L 50/16 |
| | | | 701/22 |
| 2012/0179357 A1* | 7/2012 | Phillips | F02D 17/02 |
| | | | 701/112 |
| 2014/0052361 A1* | 2/2014 | Blumenstock | F02D 41/003 |
| | | | 701/102 |
| 2015/0298684 A1* | 10/2015 | Schwartz | B60W 40/02 |
| | | | 180/65.265 |
| 2016/0096522 A1* | 4/2016 | Ortmann | B60K 6/387 |
| | | | 475/5 |
| 2016/0129918 A1* | 5/2016 | Skaff | B60W 50/14 |
| | | | 340/455 |
| 2017/0282744 A1* | 10/2017 | Koo | B60L 53/305 |
| 2018/0362017 A1* | 12/2018 | Meyer | B60K 6/26 |
| 2020/0079351 A1* | 3/2020 | Li | B60W 10/06 |
| 2020/0191069 A1* | 6/2020 | Naidu | B60W 40/10 |

* cited by examiner

METHOD AND SYSTEM FOR CONTROLLING VEHICLE ENGINE PULL-DOWN

TECHNICAL FIELD

The present disclosure relates to system for operating a powertrain of a vehicle.

BACKGROUND

In a hybrid electric vehicle, when a driver power/torque demand falls below a calibration threshold, an internal combustion engine may stop running to save fuel and the vehicle may rely on an electric machine for propulsion. The engine may restart when the driver power demand increases. Similarly, vehicles having conventional drivetrains may be provided with a stop/start feature to reduce fuel consumption during stop.

SUMMARY

A vehicle includes an engine, a wireless transceiver that receives attribute data, and a controller. The controller selectively shuts down the engine based on whether a predicted fuel savings associated with a predicted engine off duration is greater than a predicted fuel usage to restart the engine. The predicted fuel usage to restart the engine varies with a post engine restart target speed derived from the attribute data such that for a first engine pull down request and a corresponding predicted engine off duration, the engine is shut down, and for a second engine pull down request having a same corresponding predicted engine off duration, the engine is not shut down.

A method includes selectively shutting down an engine based on whether a predicted fuel savings associated with a predicted engine off duration is greater than a predicted fuel usage to restart the engine. The predicted fuel usage to restart the engine varies with a post engine restart target power derived from attribute data.

A vehicle includes an engine and a controller. The controller, responsive to identifying a route, predicts a vehicle motion pattern reflecting a predicted vehicle speed at different sections along the route using attribute data. The controller also, responsive to a power demand falling below a threshold, compares a saved fuel amount with an engine pull-up fuel consumption. The saved fuel amount depends on a length of engine pull-down predicted as a part of the motion pattern, and the engine pull-up fuel consumption depends on a desired engine speed to match a predicted speed as a part of the motion pattern. The controller further, responsive to the saved fuel amount being less than the engine pull-up fuel consumption, inhibits engine pull-down.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
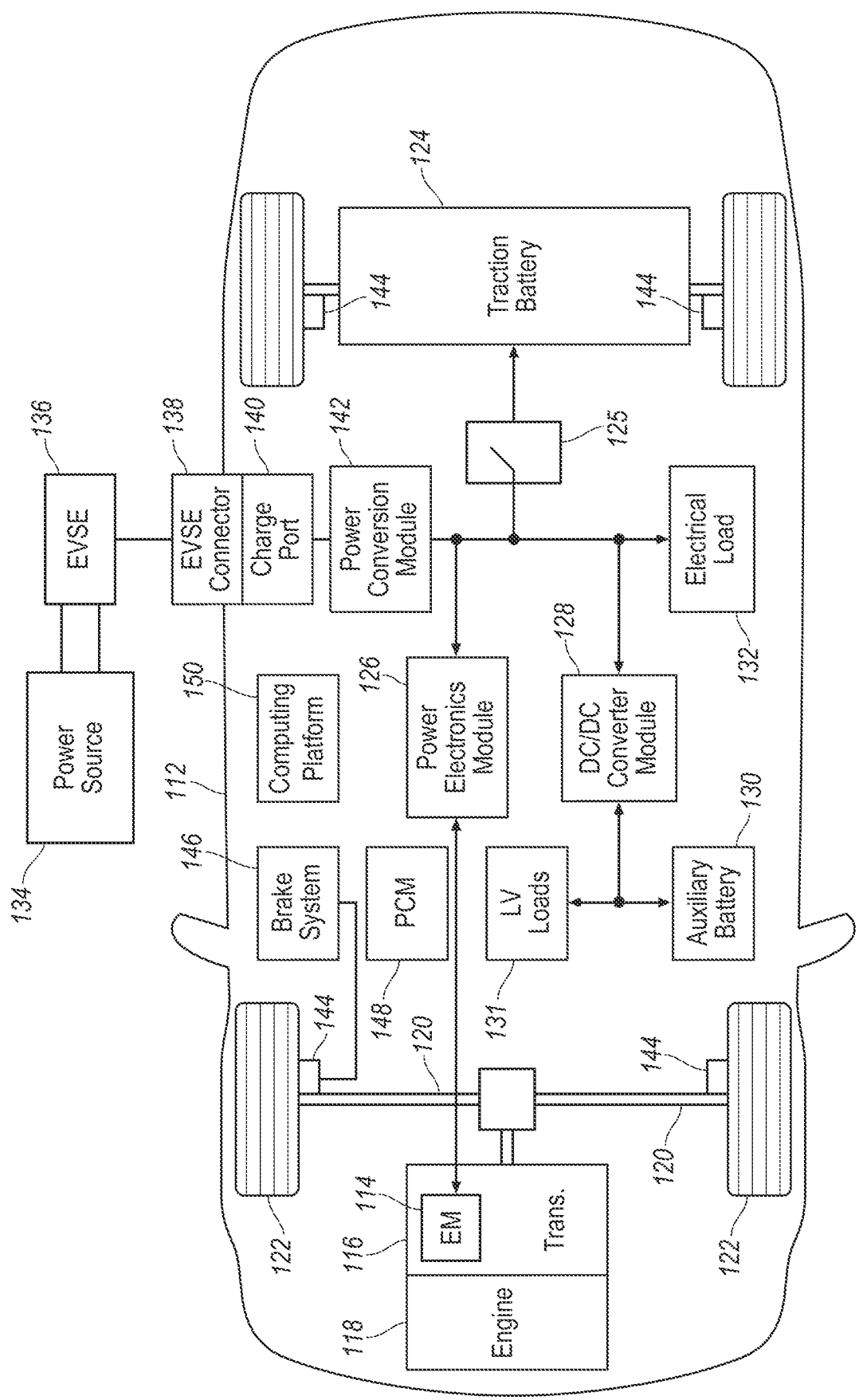
FIG. 1 is a diagram of an electrified vehicle illustrating drivetrain and energy storage components including an electric machine.

FIG. 1 depicts an electrified vehicle 112 that may be referred to as a plug-in hybrid-electric vehicle (PHEV). A plug-in hybrid-electric vehicle 112 may comprise one or more electric machines 114 mechanically coupled to a hybrid transmission 116. The electric machines 114 may be capable of operating as a motor or a generator. In addition, the hybrid transmission 116 is mechanically coupled to an engine 118. The hybrid transmission 116 is also mechanically coupled to a drive shaft 120 that is mechanically coupled to the wheels 122. The electric machines 114 can provide propulsion and braking capability when the engine 118 is turned on or off. The electric machines 114 may also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 off under certain conditions. An electrified vehicle 112 may also be a Battery Electric Vehicle (BEV). In a BEV configuration, the engine 118 may not be present. Alternatively, the vehicle 112 may be conventional vehicle having only the engine 118 without the electric machine 114.

A traction battery or battery pack 124 may store energy that can be used by the electric machines 114. The vehicle battery pack 124 may provide a high voltage direct current (DC) output. The traction battery 124 may be electrically coupled to one or more power electronics modules 126 (such as a traction inverter). One or more contactors 125 may isolate the traction battery 124 from other components when opened and connect the traction battery 124 to other components when closed. The power electronics module 126 is also electrically coupled to the electric machines 114 and provides the ability to bi-directionally transfer energy between the traction battery 124 and the electric machines 114. For example, a traction battery 124 may provide a DC voltage while the electric machines 114 may operate with a three-phase alternating current (AC) to function. The power electronics module 126 may convert the DC voltage to a three-phase AC current to operate the electric machines 114. In a regenerative mode, the power electronics module 126 may convert the three-phase AC current from the electric machines 114 acting as generators to the DC voltage compatible with the traction battery 124.

The vehicle 112 may include a variable-voltage converter (VVC) (not shown) electrically coupled between the traction battery 124 and the power electronics module 126. The VVC may be a DC/DC boost converter configured to increase or boost the voltage provided by the traction battery 124. By increasing the voltage, current requirements may be decreased leading to a reduction in wiring size for the power electronics module 126 and the electric machines 114. Further, the electric machines 114 may be operated with better efficiency and lower losses.

In addition to providing energy for propulsion, the traction battery 124 may provide energy for other vehicle electrical systems. The vehicle 112 may include a DC/DC converter module 128 that converts the high voltage DC output of the traction battery 124 to a low voltage DC supply that is compatible with low-voltage vehicle loads. An output of the DC/DC converter module 128 may be electrically coupled to an auxiliary battery 130 (e.g., 12V battery) for charging the auxiliary battery 130. The low-voltage systems having one or more low-voltage loads 131 may be electrically coupled to the auxiliary battery 130. One or more electrical loads 132 may be coupled to the high-voltage bus/rail. The electrical loads 132 may have an associated controller that operates and controls the electrical loads 146 when appropriate. Examples of the electrical loads 132 may be a fan, an electric heating element and/or an air-conditioning compressor.

The electrified vehicle 112 may be configured to recharge the traction battery 124 from an external power source 134. The external power source 134 may be a connection to an electrical outlet. The external power source 134 may be electrically coupled to a charger or electric vehicle supply equipment (EVSE) 136. The external power source 134 may be an electrical power distribution network or grid as provided by an electric utility company. The EVSE 136 may provide circuitry and controls to regulate and manage the transfer of energy between the power source 134 and the vehicle 112. The external power source 134 may provide DC or AC electric power to the EVSE 136. The EVSE 136 may have a charge connector 138 for plugging into a charge port 140 of the vehicle 112. The charge port 140 may be any type of port configured to transfer power from the EVSE 136 to the vehicle 112. The charge port 140 may be electrically coupled to a charger or on-board power conversion module 142. The power conversion module 142 may condition the power supplied from the EVSE 136 to provide the proper voltage and current levels to the traction battery 124. The power conversion module 142 may interface with the EVSE 136 to coordinate the delivery of power to the vehicle 112. The EVSE connector 138 may have pins that mate with corresponding recesses of the charge port 140. Alternatively, various components described as being electrically coupled or connected may transfer power using wireless inductive coupling.

One or more wheel brakes 144 may be provided for braking the vehicle 112 and preventing motion of the vehicle 112. The wheel brakes 144 may be hydraulically actuated, electrically actuated, or some combination thereof. The wheel brakes 144 may be a part of a brake system 146. The brake system 146 may include other components to operate the wheel brakes 144. For simplicity, the figure depicts a single connection between the brake system 150 and one of the wheel brakes 144. A connection between the brake system 146 and the other wheel brakes 144 is implied. The brake system 146 may include a controller to monitor and coordinate the brake system 146. The brake system 146 may monitor the brake components and control the wheel brakes 144 for slowing the vehicle. The brake system 146 may respond to driver commands and may also operate autonomously to implement features such as stability control. The controller of the brake system 150 may implement a method of applying a requested brake force when requested by another controller or sub-function.

The powertrain of the vehicle 112 may be operated and controlled via a powertrain control module (PCM) 148 connected to various components of the vehicle 112 via an in-vehicle network (to be described in detail below). The PCM 148 may be configured to perform various features. For instance, the PCM 148 may be configured to control the operations of the engine 118 and the electric machine 114 based on user input via an accelerator pedal (not shown) and a brake pedal (not shown). Responsive to receiving a user power demand via one or more pedals, the PCM 148 may distribute the power between the engine 118 and the electric machine 114 to satisfy the user demand. Under certain predefined conditions when less power/torque is demanded, the PCM 148 may disable the engine 118 and only rely on the electric machine 114 to provide power output to the vehicle 112. The PCM 148 may restart the engine 118 responsive to more power being needed. The PCM 148 may be further configured to perform the engine stop/start using data received from other controllers of the vehicle 112 as coordinated by a computing platform 150.

Figure 2:
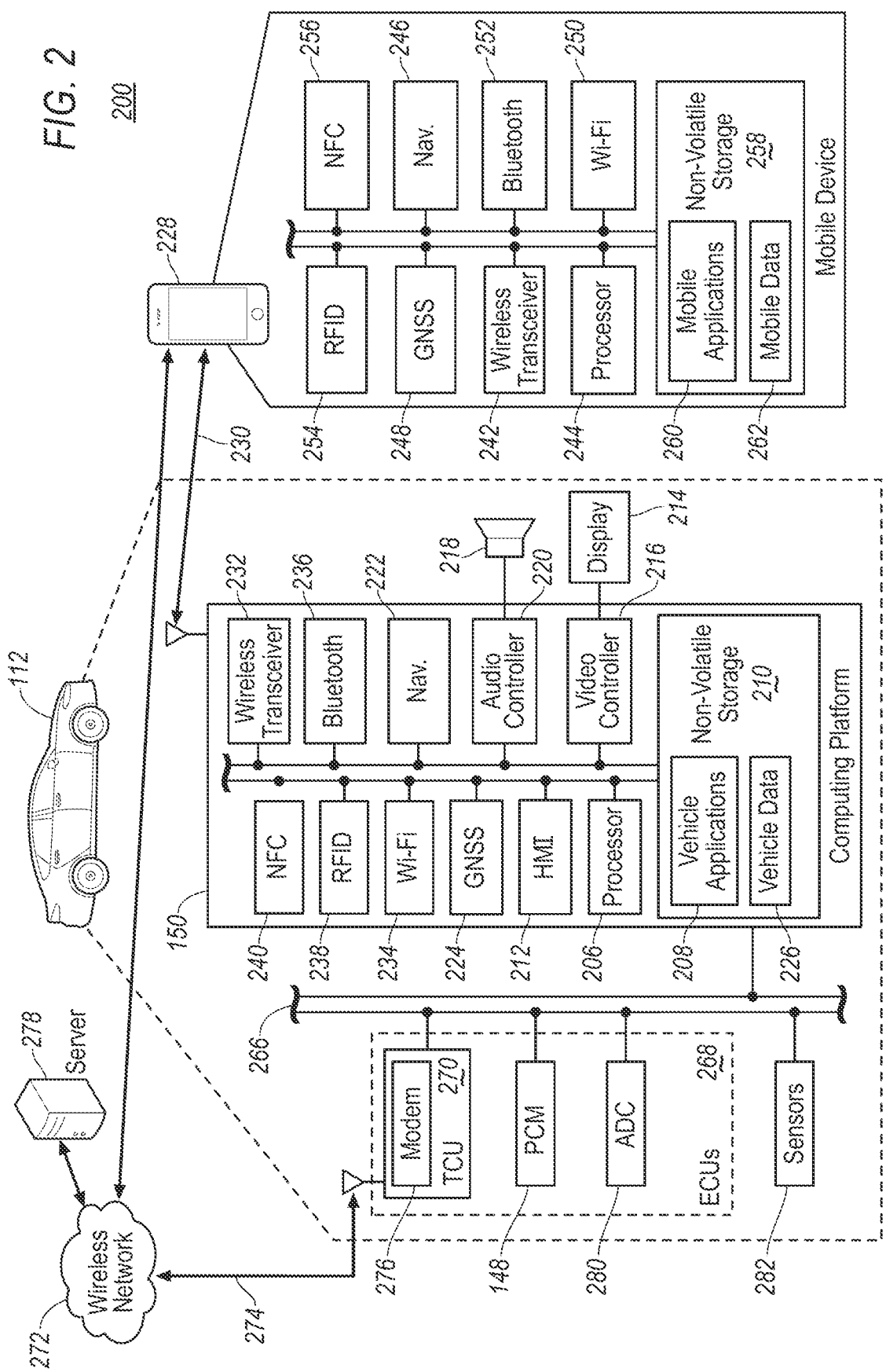
FIG. 2 is an example block topology of a vehicle system.

Referring to FIG. 2, an example block topology of a vehicle system 200 of one embodiment of the present disclosure is illustrated. As an example, the system 200 may include the SYNC system manufactured by The Ford Motor Company of Dearborn, Mich. It should be noted that the illustrated system 200 is merely an example, and more, fewer, and/or differently located elements may be used.

As illustrated in FIG. 2, the computing platform 150 may include one or more processors 206 configured to perform instructions, commands, and other routines in support of the processes described herein. For instance, the computing platform 150 may be configured to execute instructions of vehicle applications 208 to provide features such as navigation, remote controls, and wireless communications. Such instructions and other data may be maintained in a non-volatile manner using a variety of types of computer-readable storage medium 210. The computer-readable medium 210 (also referred to as a processor-readable medium or storage) includes any non-transitory medium (e.g., tangible medium) that participates in providing instructions or other data that may be read by the processor 206 of the computing platform 150. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The computing platform 150 may be provided with various features allowing the vehicle occupants/users to interface with the computing platform 150. For example, the computing platform 150 may receive input from HMI controls 212 configured to provide for occupant interaction with the vehicle 112. As an example, the computing platform 150 may interface with one or more buttons, switches, knobs, or other HMI controls configured to invoke functions on the computing platform 150 (e.g., steering wheel audio buttons, a push-to-talk button, instrument panel controls, etc.).

The computing platform 150 may also drive or otherwise communicate with one or more displays 214 configured to provide visual output to vehicle occupants by way of a video controller 216. In some cases, the display 214 may be a touch screen further configured to receive user touch input via the video controller 216, while in other cases the display 214 may be a display only, without touch input capabilities. The computing platform 150 may also drive or otherwise communicate with one or more speakers 218 configured to provide audio output and input to vehicle occupants by way of an audio controller 220.

The computing platform 150 may also be provided with navigation and route planning features through a navigation controller 222 configured to calculate navigation routes responsive to user input via e.g., the HMI controls 212, and output planned routes and instructions via the speaker 218 and the display 214. Location data that is needed for navigation may be collected from a global navigation satellite system (GNSS) controller 224 configured to communicate with multiple satellites and calculate the location of the vehicle 112. The GNSS controller 224 may be configured to support various current and/or future global or regional location systems such as global positioning system (GPS), Galileo, Beidou, Global Navigation Satellite System (GLONASS) and the like. Map data used for route planning may be stored in the storage 210 as a part of the vehicle data 226. Navigation software may be stored in the storage 210 as one the vehicle applications 208.

The computing platform 150 may be configured to wirelessly communicate with a mobile device 228 of the vehicle users/occupants via a wireless connection 230. The mobile device 228 may be any of various types of portable computing devices, such as cellular phones, tablet computers, wearable devices, smart watches, smart fobs, laptop computers, portable music players, or other device capable of communication with the computing platform 150. A wireless transceiver 232 may be in communication with a Wi-Fi controller 234, a Bluetooth controller 236, a radio-frequency identification (RFID) controller 238, a near-field communication (NFC) controller 240, and other controllers such as a Zigbee transceiver, an IrDA transceiver, a ultra-wide band (UWB) controller (not shown), and configured to communicate with a compatible wireless transceiver 242 of the mobile device 228.

The mobile device 228 may be provided with a processor 244 configured to perform instructions, commands, and other routines in support of the processes such as navigation, telephone, wireless communication, and multi-media processing. For instance, the mobile device 228 may be provided with location and navigation functions via a navigation controller 246 and a GNSS controller 248. The mobile device 228 may be provided with the wireless transceiver 242 in communication with a Wi-Fi controller 250, a Bluetooth controller 252, a RFID controller 254, an NFC controller 256, and other controllers (not shown), configured to communicate with the wireless transceiver 232 of the computing platform 150. The mobile device 228 may be further provided with a non-volatile storage 258 to store various mobile application 260 and mobile data 262.

The computing platform 150 may be further configured to communicate with various components of the vehicle 112 via one or more in-vehicle networks 266. The in-vehicle network 266 may include, but is not limited to, one or more of a controller area network (CAN), an Ethernet network, and a media-oriented system transport (MOST), as some examples. Furthermore, the in-vehicle network 266, or portions of the in-vehicle network 266, may be a wireless network accomplished via Bluetooth low-energy (BLE), Wi-Fi, UWB, or the like.

The computing platform 150 may be configured to communicate with various electronic control units (ECUs) 268 of the vehicle 112 configured to perform various operations. As discussed above, the computing platform 150 may be configured to communicate with the PCM 148 via the in-vehicle network 266. The computing platform 150 may be further configured to communicate with a TCU 270 configured to control telecommunication between vehicle 112 and a wireless network 272 through a wireless connection 274 using a modem 276. The wireless connection 274 may be in the form of various communication networks e.g., a cellular network. Through the wireless network 272, the vehicle may access one or more servers 278 to access various content for various purposes. It is noted that the terms wireless network and server are used as general terms in the present disclosure and may include any computing network involving carriers, router, computers, controllers, circuitry or the like configured to store data and perform data processing functions and facilitate communication between various entities. The ECUs 268 may further include an autonomous driving controller (ADC) 280 configured to control an autonomous driving feature of the vehicle 112. Driving instructions may be received remotely from the server 278. The ADC 280 may be configured to perform the autonomous driving features using the driving instructions combined with navigation instructions from the navigation controller 222. The ECUs 268 may be provided with or connected to one or more sensors 282 providing signals related to the operation of the specific ECU 268. For instance, sensors 282 may include an ambient temperature sensor configured to measure the ambient temperature of the vehicle 112. The sensors 282 may further include one or more engine/coolant temperature sensors configured to measure the temperature of the engine/coolant to provide to the PCM 148. The sensors 282 may further include a camera configured to capture an image near the vehicle to enable various features such as the autonomous driving features via the ADC 280.

Figure 3:
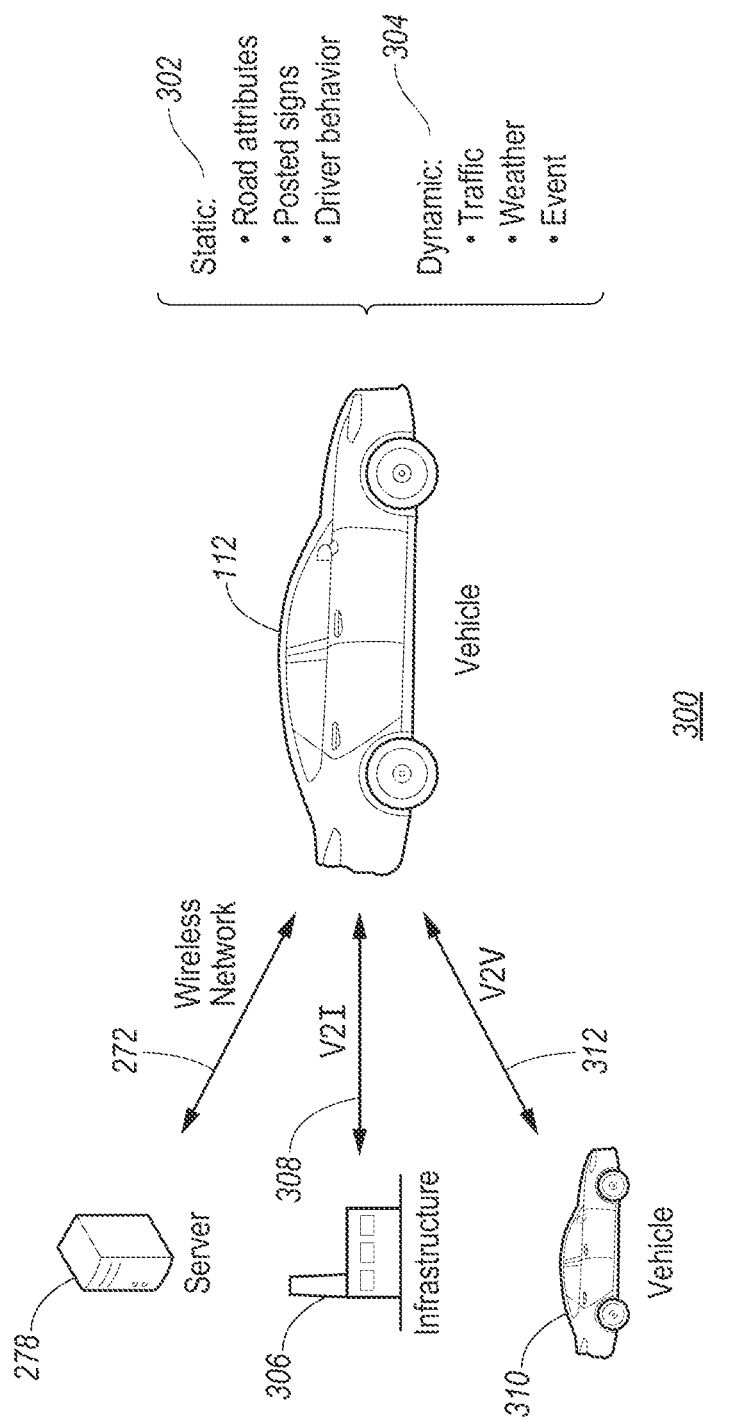
FIG. 3 is an example block diagram of the vehicle engine pull-down/up system.

The PCM 148 may be configured to operate the vehicle engine pull-down and pull-up feature based on data received from various sources. Referring to FIG. 3, an example diagram 300 of the vehicle engine pull-down/up system is illustrated. In general, the data used by the PCM 148 may be classified into one of a static attribute 302 and a dynamic attribute 304 received from various sources. The static attribute 302 may reflect characteristics of a route on which the vehicle 112 traverses that does not vary over time. As a few non-limiting examples, the static attribute 302 may include various road attributes of the route such as number of lanes, speed limit, road pavement condition, road grade or the like. The static attribute 302 may further include road signs posted near on the vehicle route. The static attribute 302 may further include one or more driver behavior attributes (driving pattern) of a vehicle user which records a pattern/habit of driving of the user operating the vehicle. The driver behavior may be previously record by the vehicle 112. Alternatively, the driver behavior may be identified or received from a digital entity associated with the vehicle driver (such as the mobile device 228). The driver behavior attribute may reflect driving patterns of one or more drivers operating the vehicle. For instance, some drivers are more aggressive and drive faster by applying accelerator pedal harder. The driver behavior attribute may affect if the vehicle 112 can pass an intersection before the traffic light turn red in some situations.

The dynamic attribute may reflect characteristics of the route that may vary over time. As a few non-limiting examples, the dynamic attribute 304 may include traffic and weather conditions on the route which may affect the operation of the vehicle 112. The dynamic attribute 304 may further include road events such as accident and road work on the route. As an example, the live traffic data and traffic signal timings may be sent to the vehicle 112. Coupled with the static attributes 302, the PCM 148 of the vehicle 112 may predict a motion pattern reflecting the time and location to accelerate, decelerate and stop on the vehicle route, so that the engine pull-down may be calibrated more accurately.

The vehicle 112 may be configured to obtain the static and dynamic attributes 302, 304 from a variety of sources. For instance, the vehicle 112 may obtain the attributes from one or more cloud servers 278 via the wireless network 272 through the TCU 270. Additionally or alternatively, the vehicle 112 may be configured to access the servers 278 via the mobile device 228 associated with the vehicle user. The vehicle 112 may be further configured to communicate with an infrastructure device 306 via a vehicle-to-infrastructure (V2I) link to obtain the attributes. The infrastructure 306 may include sensor and communication devices along the vehicle route to provide driving information to the vehicle 112. For instance, the infrastructure device 306 may include a smart traffic light transmitting signals indicating the status and timing of the traffic signal to vehicles nearby. The vehicle 112 may be further configured to communicate with one or more fleet vehicles 310 provided with compatible transceivers via a vehicle-to-vehicle (V2V) link 312. For instance, the fleet vehicle 310 may detect an attribute via a fleet vehicle sensor and share the attribute to the vehicle 112. The wireless network 272, the V2I link 308 and the V2V link 312 may be collectively referred to as a vehicle-to-everything connection. Additionally, the vehicle 112 may be configured to obtain the attributes via one or more sensors 282.

Figure 4:
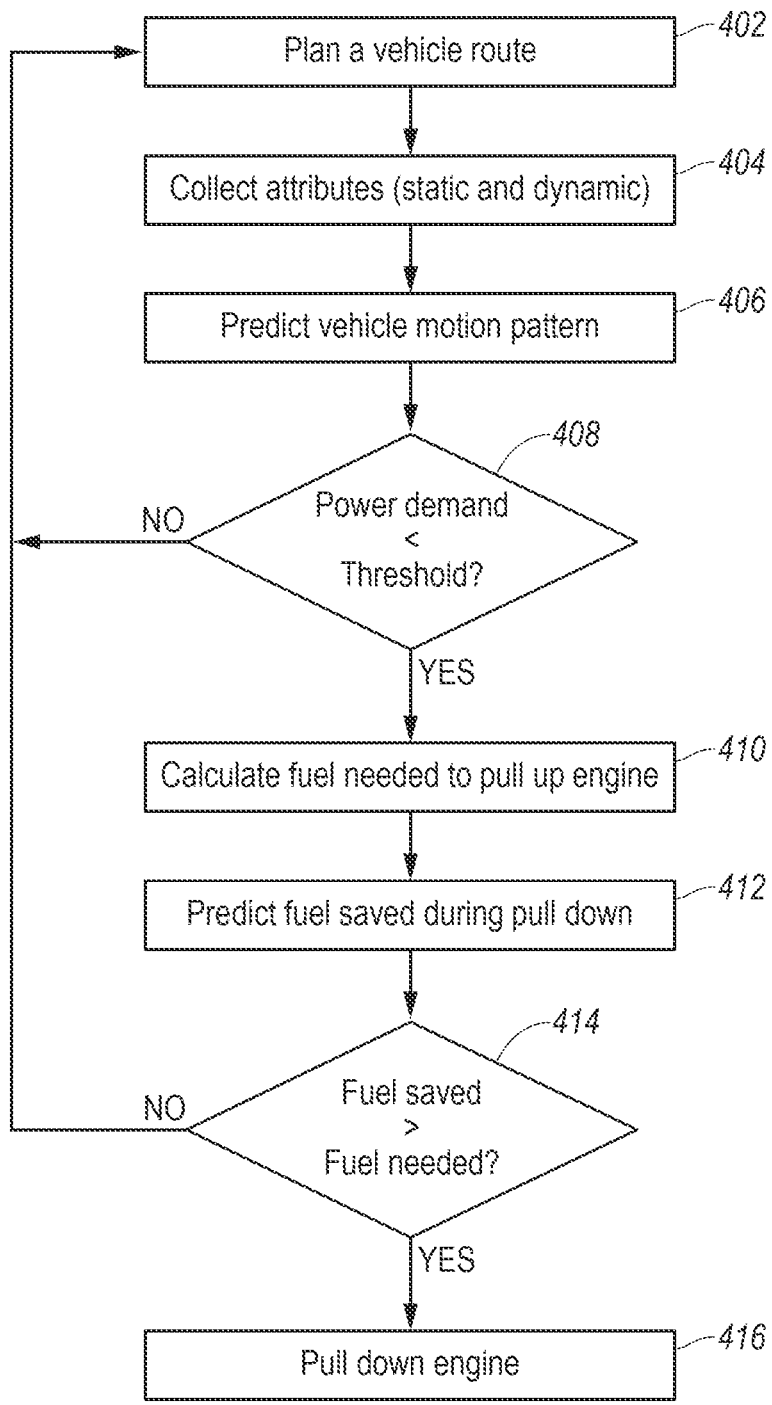
FIG. 4 is an example flow diagram of a process for engine pull-down decision making.

Referring to FIG. 4, an example flow diagram of a process 400 for engine pull-down calibration is shown. With continuing reference to FIGS. 1-3, the process 400 may be performed via one or more controllers/platforms of the vehicle 112. For simplicity purposes, the following description will be primary made with regard to the PCM 148 although the process 400 may be performed by other controllers in lieu of or in combination with the PCM 148. At operation 402, the vehicle 112 plans a route responsive to a user starting to use the vehicle 112. The route may be planned using the navigation software 208 via the navigation controller 222 responsive to a destination input by a user. Alternatively, the computing platform 150 and the navigation controller 222 may automatically plan a predicted route using the current location and/or historical route of the vehicle 112 in the absence of the navigation destination input by the user. Having the vehicle route available, at operation 404, the vehicle 112 collects both the static and dynamic attributes 302, 304 along the route from various sources. At operation 406, the vehicle 112 predicts a vehicle motion pattern along the planned route using the attributes collected. The motion pattern may include a predicted vehicle speed at different sections of the route. For instance, the traffic attribute 304 may reflect a traffic flow and timing of a plurality of traffic lights on the vehicle route. The vehicle 112 may use the traffic flow data, combined with the driver behavior and other attributes, to predict the status of each traffic light when the vehicle 112 arrives, so as to determine if the vehicle 112 needs to stop or slow down at a red light, or to drive by without stopping when the light is green for example.

At operation 408, the vehicle 112 verifies if a vehicle power demand (or torque demand) is below a predetermined threshold responsive to a user input via vehicle pedals. For instance, a release of the vehicle accelerator pedal and/or a depression of the vehicle brake pedal may be interpreted by the PCM 148 as a user intent to reduce power demand. The PCM 148 may be configured to calculate a vehicle power demand using the position of the vehicle pedals in combination with other factors such as vehicle speed, vehicle load or the like and determine if the power demand is below the threshold. If the answer is a no, indicating power from the electric machine 114 alone is insufficient to satisfy the power requirement of the vehicle 112, the process returns to operation 402. Otherwise, if the PCM 148 determines that the electric machine 114 is capable of propelling the vehicle 112 to satisfy the motion requirement without the torque output from the engine 118, the process proceeds to operation 410 to calculate an amount of fuel that is needed to pull-up (or restart) the engine 118 when needed. In the present disclosure, engine pull-up may generally refer to the process to start the engine 118 and reach a desired revolution-per-minute (RPM). The desired RPM may vary depending on the motion status of the vehicle 112. For instance, when the PCM 148 starts the engine 118 while the vehicle 112 is at a stationary status (i.e. zero speed) such as pulling up at a stop sign, the desired RPM may be the idling speed of the engine (e.g. 700 RPM). Alternatively, if the engine 118 starts while the vehicle 112 is in motion with a speed, the desired RPM may be a higher speed which matches the engine rotation with the vehicle speed through calculatable gear ratio of the transmission 116. In this case, the engine pull-up may consume more fuel. The PCM 148 may further use other factors of the vehicle 112 to adjust the fuel consumption calculation. As a few non-limiting examples, the PCM 148 may further consider any accessory load (e.g. air-conditioning compressor load), engine oil and coolant temperature, ambient temperature to calculate the fuel needed to pull-up the engine 118. In general, more fuel is need in the presence of any accessory load and lower engine and ambient temperatures.

At operation 412, the PCM 148 calculates a predicted amount of fuel that may be saved if the engine is pulled down (i.e. stopped). This calculation relies on the vehicle motion pattern determined at operation 406 to predict the duration of time of the engine pull-down. In other words, the PCM 148 may predict how long the engine 118 is to remain at the stopped status until the pull-up is needed using the predicted vehicle motion pattern and calculate the fuel amount saved during the time period when the engine 118 stops. At operation 414, the PCM 148 compares the saved fuel predicted at operation 412 with the fuel need to pull-up the engine 118 predicted at operation 410 to determine if the engine pull-down is justified. If the fuel saved is not greater than the fuel needed to pull-up, the PCM 148 determines the engine pull-down is not justified and the process returns to operation 402 without stopping the engine 118. Otherwise, responsive to determining the engine pull-down is justified, the process proceeds to operation 416 and the PCM 148 stops the engine 118 to cut the fuel consumption.

Figure 5:
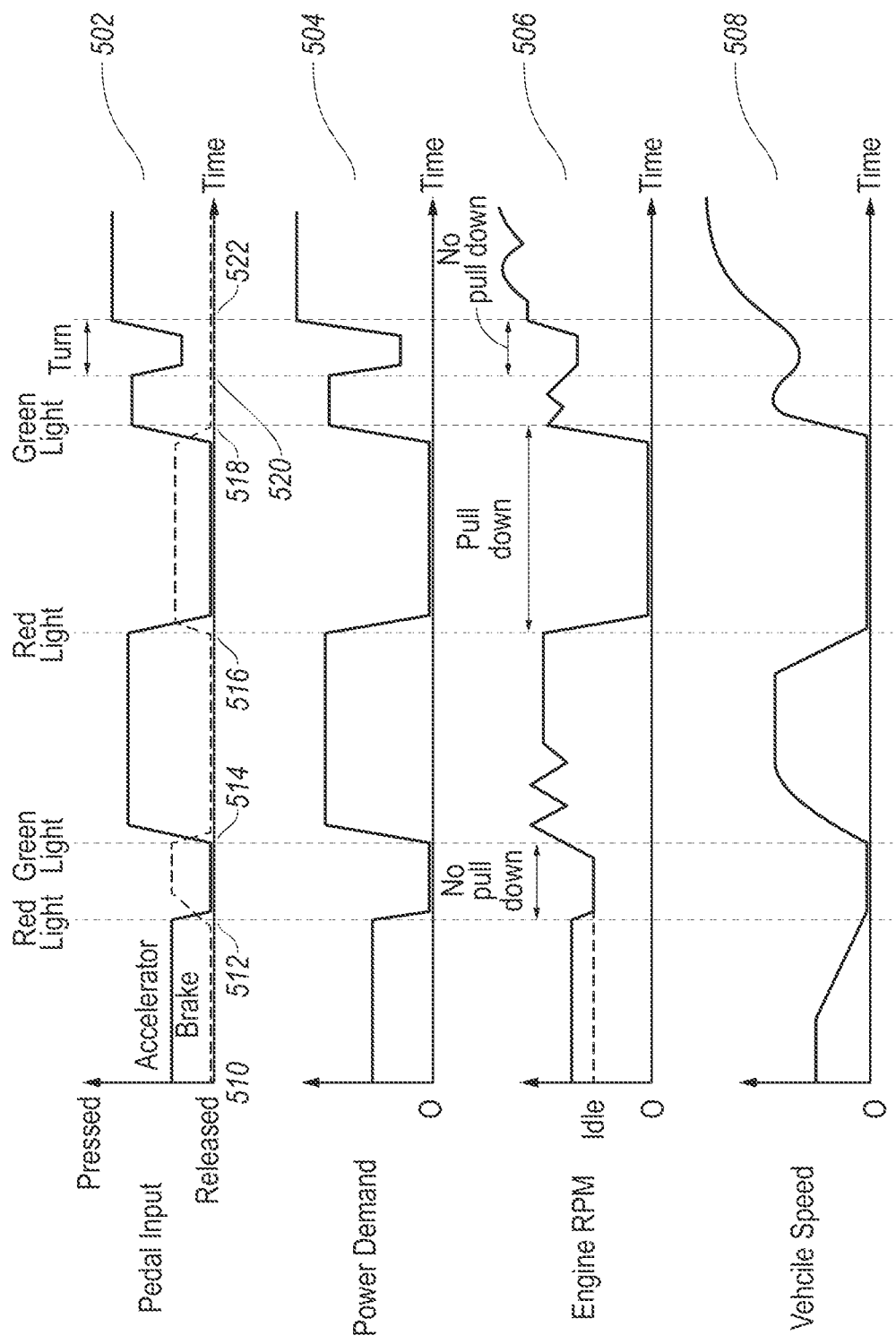
FIG. 5 illustrates example time graphs of various parameters of the vehicle in the engine pull-down decision making.

The operations of process 400 may be applied to various situations. Referring to FIG. 5, time graphs of various parameters of the vehicle 112 for the engine pull-down decision-making process of one embodiment of the present disclosure is illustrated. Four parameters are illustrated in FIG. 5. A first time graph 502 illustrates pedal inputs for both the accelerator (solid line) and brake (dashed line). A second time graph 504 illustrates the vehicle power demand interpreted by the PCM 148 based on the pedal inputs. A third time graph 506 illustrates the engine RPM. And a fourth time graph 508 illustrates the vehicle speed during the process. Referring to the first time graph 502, the user applies a medium accelerator pedal input from time 510 until time 512 when the vehicle 112 reaches a red light and the brake pedal is applied. The red light status of the traffic signal at time 512 may be obtained by the vehicle 112 as the traffic attribute 304 in advance and therefore the vehicle 112 may predict that the traffic light will turn green soon enough at time 514. Since the time period between 512 and 514 is short, the PCM 148 may determine that an engine pull-down is not justified even though power demand is zero during the time period as illustrated in the second time graph 504. As illustrated in the third time graph 506, the engine 118 merely idles between 512 and 514 and does not stop running. As the vehicle continues to drive at time 514 when the traffic light turns green as predicted, the user may apply a heavy accelerator pedal input and the vehicle speed increases as illustrated in time graph 508. At time 516, the vehicle 112 stops at a second red light signal. Here, the red light signal is long enough as predicted to justify the engine pull-down. The engine stops at around time 516 as illustrated in time graph 506. When the traffic light turns green at time 518, the PCM 148 pulls up the engine to continue to drive the vehicle 112. Between time 520 and 522, the user releases the accelerator pedal by applying a light input while the vehicle makes a turn. Although the light input may be interpreted by the PCM 148 as a low power demand below the threshold, the vehicle 112 may predict an immediate power demand right after the turn is finished at time 522 based on the traffic attribute 304 and the user behavior attribute 302 (in this case, the user is a fast driver). Therefore, no engine pull-down is applied between time 520 and 522.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
   an engine;
   a wireless transceiver configured to receive attribute data; and
   a controller programmed to selectively shut down the engine based on whether a predicted fuel savings associated with a predicted engine off duration is greater than a predicted fuel usage to restart the engine, wherein the predicted fuel usage to restart the engine varies with a post engine restart target speed derived from the attribute data such that for a first engine pull down request and a corresponding predicted engine off duration, the engine is shut down, and for a second engine pull down request having a same corresponding predicted engine off duration, the engine is not shut down.

2. The vehicle of claim 1, wherein the attribute data describe traffic conditions and signal timing.

3. The vehicle of claim 2, wherein the attribute data further describe a road grade and a speed limit.

4. The vehicle of claim 1, wherein the controller is further configured to predict the target speed using a record of driver behavior.

5. The vehicle of claim 1, wherein the wireless transceiver is further configured to receive the attribute data from a fleet vehicle via a vehicle-to-vehicle link.

6. The vehicle of claim 1, wherein the wireless transceiver is further configured to receive the attribute data from a remote server or a local infrastructure device.

7. The vehicle of claim 1 further comprising a camera configured to capture the attribute data.

8. A method comprising:
   selectively shutting down an engine based on whether a predicted fuel savings associated with a predicted engine off duration is greater than a predicted fuel usage to restart the engine, wherein the predicted fuel usage to restart the engine varies with a post engine restart target power derived from attribute data.

9. The method of claim 8 wherein the predicted fuel usage to restart the engine varies with the post engine restart target power derived from the attribute data such that for a first engine pull down request and a corresponding predicted engine off duration, the engine is shut down, and for a second engine pull down request having a same corresponding predicted engine off duration, the engine is not shut down.

10. The method of claim 8, wherein the attribute data describe traffic conditions and a signal timing.

11. The method of claim 10, wherein the attribute data further describe a road grade and a speed limit.

12. The method of claim 8 further comprising predicting the target speed using a record of driver behavior.

13. The method of claim 8 further comprising receiving the attribute data from a fleet vehicle via a vehicle-to-vehicle link.

14. The method of claim 8 further comprising receiving the attribute data from a remote server or from a local infrastructure device.

15. The method of claim 8 further comprising capturing, via a camera, the attribute data.

16. A powertrain system comprising:
   an engine; and
   a controller programmed to
      responsive to identifying a route, predict a motion pattern reflecting a predicted speed at different sections along the route using attribute data,
      responsive to a power demand falling below a threshold, compare a saved fuel amount with an engine pull-up fuel consumption, wherein the saved fuel amount depends on a length of engine pull-down predicted as a part of the motion pattern, and the engine pull-up fuel consumption depends on a desired engine speed to match a predicted speed as a part of the motion pattern, and
      responsive to the saved fuel amount being less than the engine pull-up fuel consumption, inhibit engine pull-down.

17. The system of claim 16, wherein the attribute data describes a traffic condition, a signal timing on the route, a road grade, or a speed limit.

18. The system of claim 16 further comprising a wireless transceiver configured to receive the attribute data.

* * * * *